United States Patent
Bellino et al.

(10) Patent No.: US 10,100,750 B2
(45) Date of Patent: Oct. 16, 2018

(54) PROPULSION CONTROL SYSTEM FOR A VEHICLE

(71) Applicant: GM GLOBAL TECHNOLOGY OPERATIONS LLC, Detroit, MI (US)

(72) Inventors: Michael John Bellino, Royal Oak, MI (US); Bryan W Shevock, Linden, MI (US); Baljeet Singh Jonjua, Rochester Hills, MI (US)

(*) Notice: Subject to any disclaimer, the term of this patent is extended or adjusted under 35 U.S.C. 154(b) by 0 days.

(21) Appl. No.: 15/453,937

(22) Filed: Mar. 9, 2017

(65) Prior Publication Data
US 2018/0258866 A1 Sep. 13, 2018

(51) Int. Cl.
*F02D 11/02* (2006.01)
*F02D 28/00* (2006.01)
*F02D 11/10* (2006.01)
*F02D 41/26* (2006.01)

(52) U.S. Cl.
CPC ............ *F02D 11/105* (2013.01); *F02D 11/02* (2013.01); *F02D 41/26* (2013.01); *B60Y 2300/28* (2013.01); *F02D 2200/602* (2013.01); *F02D 2250/18* (2013.01)

(58) Field of Classification Search
None
See application file for complete search history.

(56) References Cited

U.S. PATENT DOCUMENTS

| | | | |
|---|---|---|---|
| 7,769,520 B2 | 8/2010 | Ryderstam et al. | |
| 8,560,143 B2 | 10/2013 | Fleming et al. | |
| 8,935,080 B2 | 1/2015 | Szwabowski et al. | |
| 9,062,614 B2 | 6/2015 | Szwabowski et al. | |
| 9,476,369 B2 | 10/2016 | Gregg et al. | |
| 9,682,710 B2* | 6/2017 | Darnell | B60W 50/082 |
| 2011/0238251 A1* | 9/2011 | Wright | B60L 15/20 701/22 |
| 2014/0372012 A1* | 12/2014 | Darnell | B60W 50/10 701/110 |
| 2015/0119189 A1* | 4/2015 | Okubo | B60W 10/06 477/3 |
| 2015/0232098 A1 | 8/2015 | Crombez et al. | |
| 2016/0082972 A1* | 3/2016 | Fairgrieve | B60W 50/14 701/84 |
| 2016/0339906 A1* | 11/2016 | Nefcy | B60K 6/547 |
| 2017/0101951 A1* | 4/2017 | Darnell | F02D 41/04 |
| 2017/0356350 A1* | 12/2017 | Li | F02D 11/02 |

* cited by examiner

*Primary Examiner* — Thomas G Black
*Assistant Examiner* — Demetra R Smith-Stewart

(57) ABSTRACT

A propulsion control system for a vehicle includes a driver pedal, a driver pedal position sensor that outputs a driver pedal position signal that indicates a position of the driver pedal, a memory that stores a first pedal map, and a processor that generates a torque request based upon the driver pedal position signal and the first pedal map. The first pedal map correlates a value of the driver pedal position signal to the torque request for a propulsion system in the vehicle and a first portion of the first pedal map near a traction limit has a first slope that defines the rate of change of the torque request to be less than the rate of change of the pedal position.

20 Claims, 6 Drawing Sheets

PROPULSION CONTROL SYSTEM FOR A VEHICLE

FIELD

The present disclosure relates to a propulsion control system for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Conventional propulsion control systems for vehicles may result in a torque request from a prime mover in the vehicle that exceeds the capability of a driving member to use that torque to propel the vehicle. The torque applied to the driving member may exceed a traction limit. An exemplary situation in which this has been known to occur is when the vehicle is in a heavily loaded and/or towing configuration and is attempting to climb a grade. In those situations, the amount of torque which is required to propel the vehicle may approach the traction limit which results in a very narrow torque range in which the vehicle may successfully climb the grade. As that torque range narrows it becomes very difficult, if not impossible, for a driver to input an appropriate request for a torque to the propulsion system which results in an output torque that falls within and stays within that very narrow range.

SUMMARY

In an exemplary aspect, a propulsion control system for a vehicle includes a driver pedal, a driver pedal position sensor that outputs a driver pedal position signal that indicates a position of the driver pedal, a memory that stores a first pedal map, and a processor that generates a torque request for a propulsion system in the vehicle based upon the driver pedal position signal and the first pedal map. The first pedal map correlates a value of the driver pedal position signal to the torque request and a first portion of the first pedal map near the traction limit has a first slope that defines the rate of change of the torque request to be less than the rate of change of the pedal position.

In another exemplary embodiment, a maximum torque request value defined by the first pedal map is substantially equal to the traction limit.

In another exemplary embodiment, a maximum torque request value defined by the first pedal map exceeds the traction limit.

In another exemplary embodiment, a maximum torque request value defined by the first pedal map at a maximum pedal position corresponds to less than a maximum possible torque output from the propulsion system.

In another exemplary embodiment, a second portion of the first pedal map has a second slope that is greater than the first slope.

In another exemplary embodiment, the second portion of the first pedal map is below the traction limit.

In another exemplary embodiment, the second portion of the first pedal map is above the traction limit.

In another exemplary embodiment, the memory further stores a second pedal map having a third slope that is greater than the first slope.

In another exemplary embodiment, the system further includes a mode indicator that indicates one of a first mode and a second mode, and the processor generates the torque request based upon the driver pedal position signal and the first pedal map in response to the mode indicator indicating the first mode and generates the torque request based upon the driver pedal position signal and the second pedal map in response to the mode indicator indicating the second mode.

In another exemplary embodiment, the second mode includes one of a tow/haul mode and a reverse mode.

In this manner, a much wider range of pedal positions within which a torque request may exceed a required torque to propel the vehicle but does not exceed a traction limit becomes available to a driver of a vehicle. This makes is much easier to drive the vehicle under conditions in which the vehicle may be traction limited as in, for example, a heavily loaded condition, attempting to traverse a steep grade, and/or the like.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
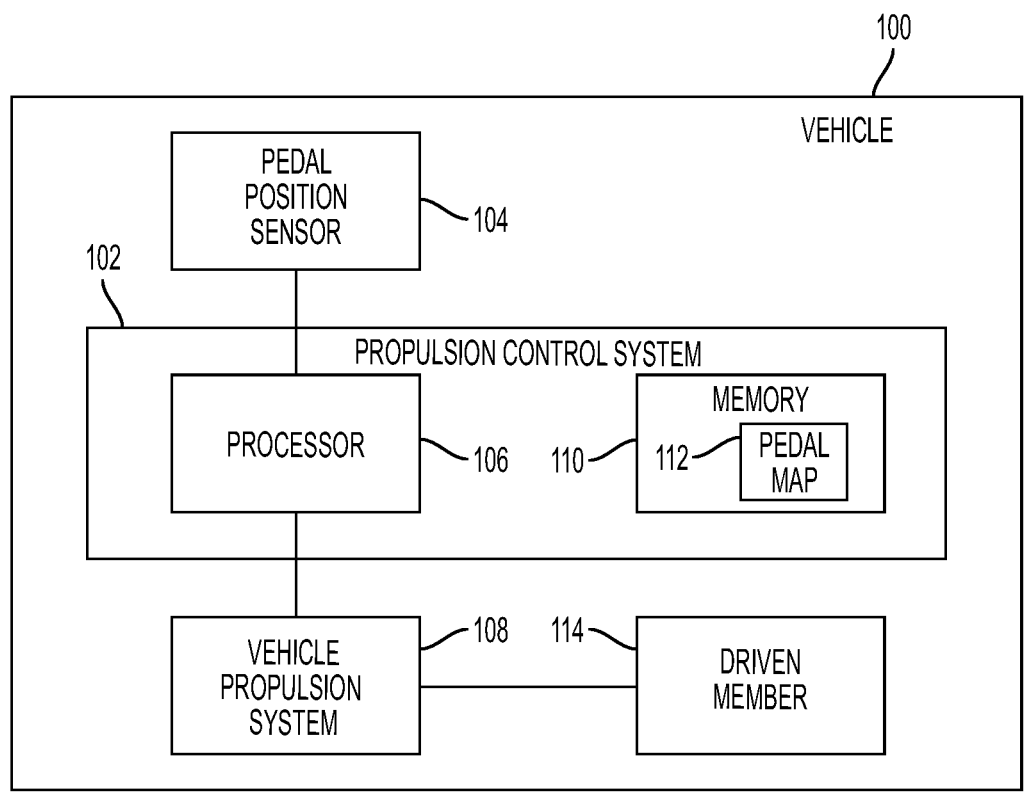
FIG. 1 is a schematic illustration of a vehicle 100 which includes a propulsion control system 102.

FIG. 1 is a schematic illustration of a vehicle 100 which includes a propulsion control system 102. The vehicle includes a user input which includes an accelerator pedal with a pedal position sensor 104 that provides a pedal position signal to the propulsion control system 102 that corresponds to a driver accelerator pedal input. A processor 106 in the propulsion control system 102 receives the pedal position signal and outputs a torque request to the vehicle propulsion system 108. To generate that torque request the processor 106 may refer to a memory 110 that stores a pedal map 112. The vehicle propulsion system 108 generates a torque which is applied to a driven member 114 such as, for example, a driven wheel of the vehicle in contact with a surface (not shown).

Figure 2:
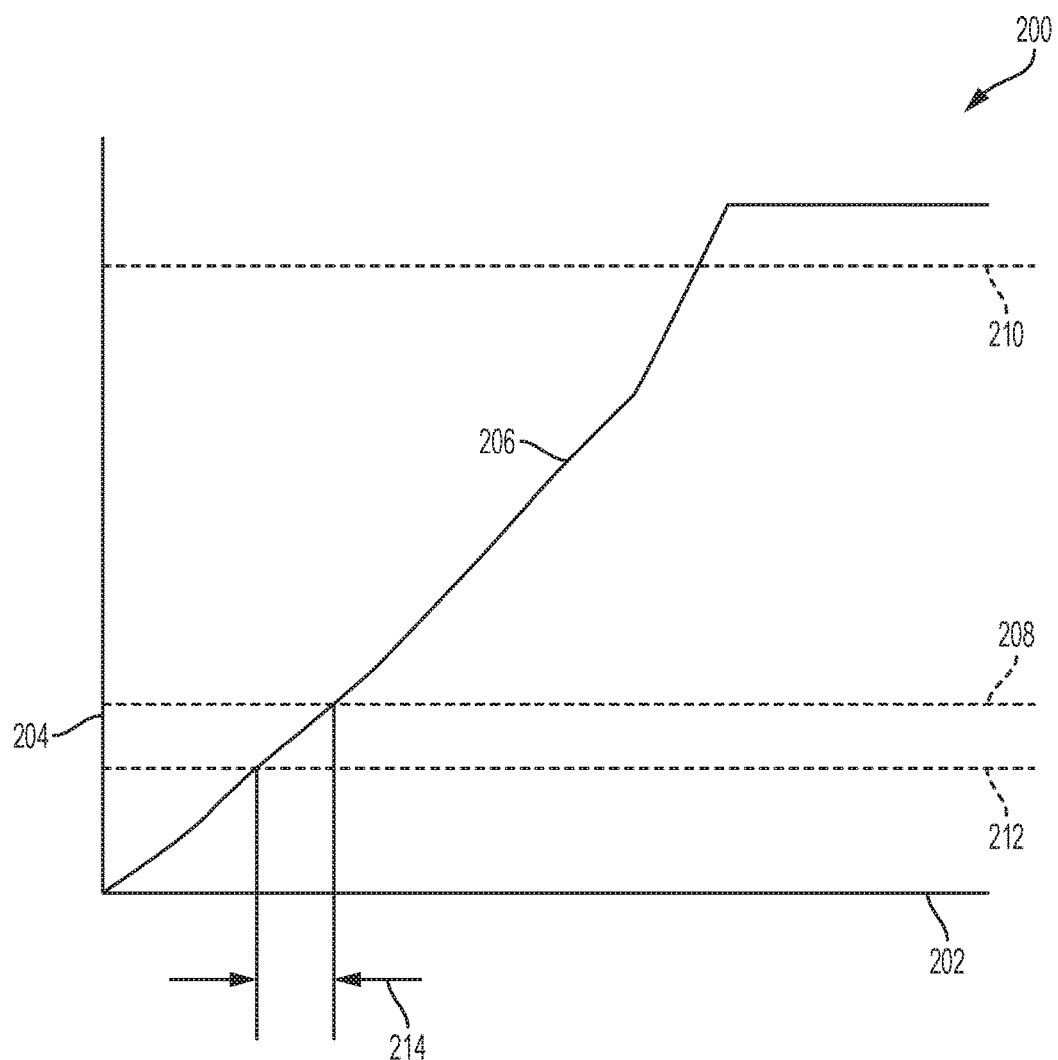
FIG. 2 is a graph 200 that illustrates the relationship between the pedal position on the horizontal axis 202 and the torque request in accordance with a pedal map 206 on the vertical axis 204.

FIG. 2 is a graph 200 that illustrates the relationship between the pedal position on the horizontal axis 202 and the torque request in accordance with a conventional pedal map on the vertical axis 204. This relationship is indicated by the pedal map 206. The graph 200 further indicates the traction limit 208 and the maximum available torque 210 from the prime mover in the vehicle. The traction limit 208 may, for example, be determined based upon tests from the vehicle traversing an 11% grade. Another horizontal line 212 indicates the torque that is required for the vehicle to start to climb the grade. In the situation illustrated in FIG. 2, the range of pedal positions 214 which result in a torque request that exceeds the required torque 212 but does not exceed the traction limit 208 is very narrow. A driver of the vehicle would have a very hard time finding that range, let alone holding the pedal position so that the torque request falls within that very narrow range.

Figure 3:
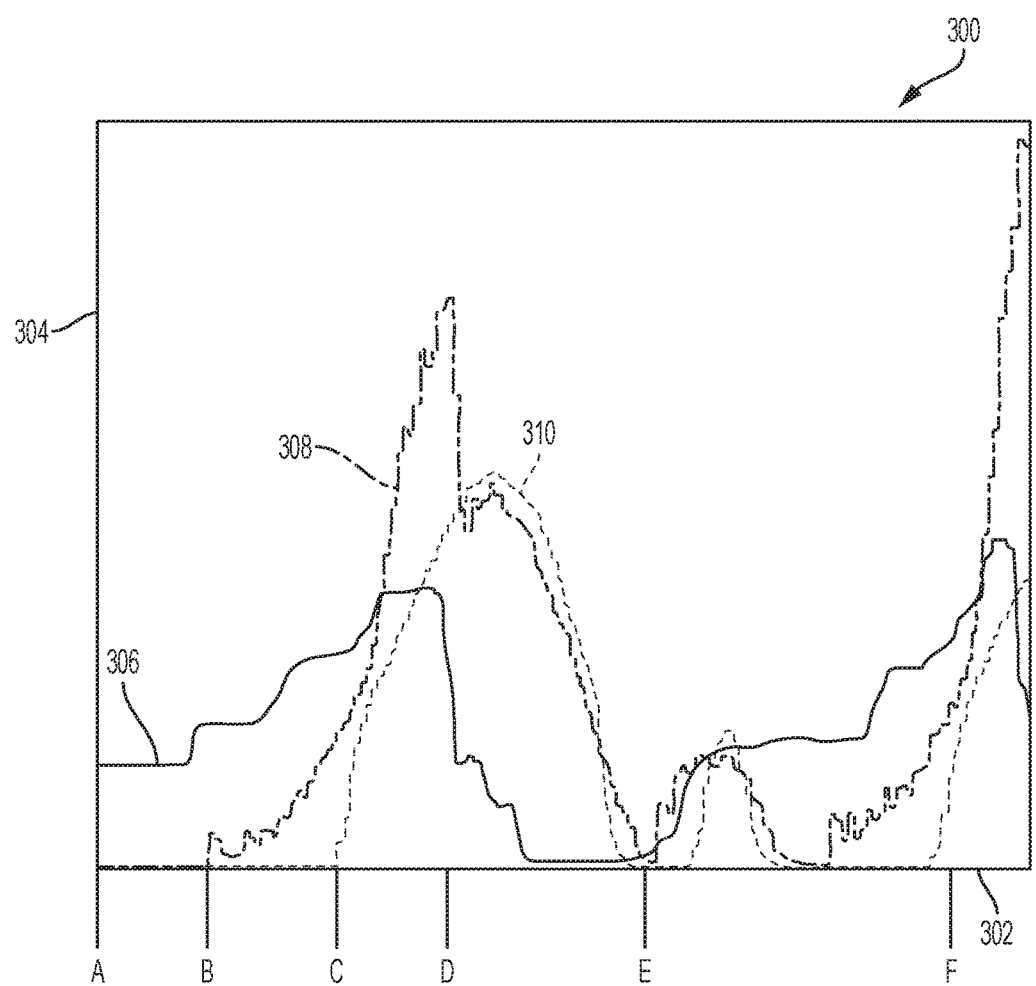
FIG. 3. is a graph 300 illustrating an exemplary situation when driving a vehicle which includes a propulsion control system that uses the pedal map 206.

FIG. 3. is a graph 300 illustrating the difficulty of this situation. The horizontal axis 302 of the graph illustrates the passage of time while the vertical axis 304 of the graph illustrates the amplitude of various signals which will now be described. Line 306 represents the pedal position of the accelerator as controlled by an operator of the vehicle. Line 308 illustrates the speed of the driven wheel and line 310 illustrates the speed of a non-driven wheel. The speed of the non-driven wheel 310 is an indicator of the actual vehicle speed or the ability of the vehicle to successfully climb the grade. In a perfect situation, the speed of the driven wheel 308 would match the speed of the non-driven wheel 310.

The driver starts to slowly increase the pedal position 306 at time "A". Note that both wheel speeds 308 and 310 are zero indicated that the vehicle is stationary. At time "B" the pedal position 306 results in a torque request (using the pedal map 206 of FIG. 2) which causes the driven wheel speed 308 to start to increase. However, the non-driven wheel speed 310 does not start to exceed a zero speed until time "C". Between times "B" and "C" the driver continues to slowly increase the pedal position 306 until the non-driven wheel speed 310 indicates that the vehicle starts to climb the grade. This is true because the pedal position 306 just before time "C" results in a torque request which exceeds the required torque 212. However, at time "C" the driver only slightly further increases the pedal position 306 which results in a torque request that exceeds the traction limit 208. This is indicated by the large increase in the driven wheel speed 308 between the times "C" and "D" and a large gap in speed between the driven wheel speed 308 and non-driven wheel speed 310. The driver sensing the large increase of driven wheel speed 308 above the non-driven wheel speed 310 quickly reduces the pedal position 306 at time "D". This results in both the driven wheel speed 308 and non-driven wheel speed 310 rapidly decreasing together until reaching a zero speed at about time "E". At this point, the driver again attempts to gradually increase the pedal position 306 to try again. Unfortunately, the driven wheel speed 308 again quickly exceeds the traction limit and a large gap in speed forms between the driven wheel speed 308 and the non-driven wheel speed at time "F".

Figure 4:
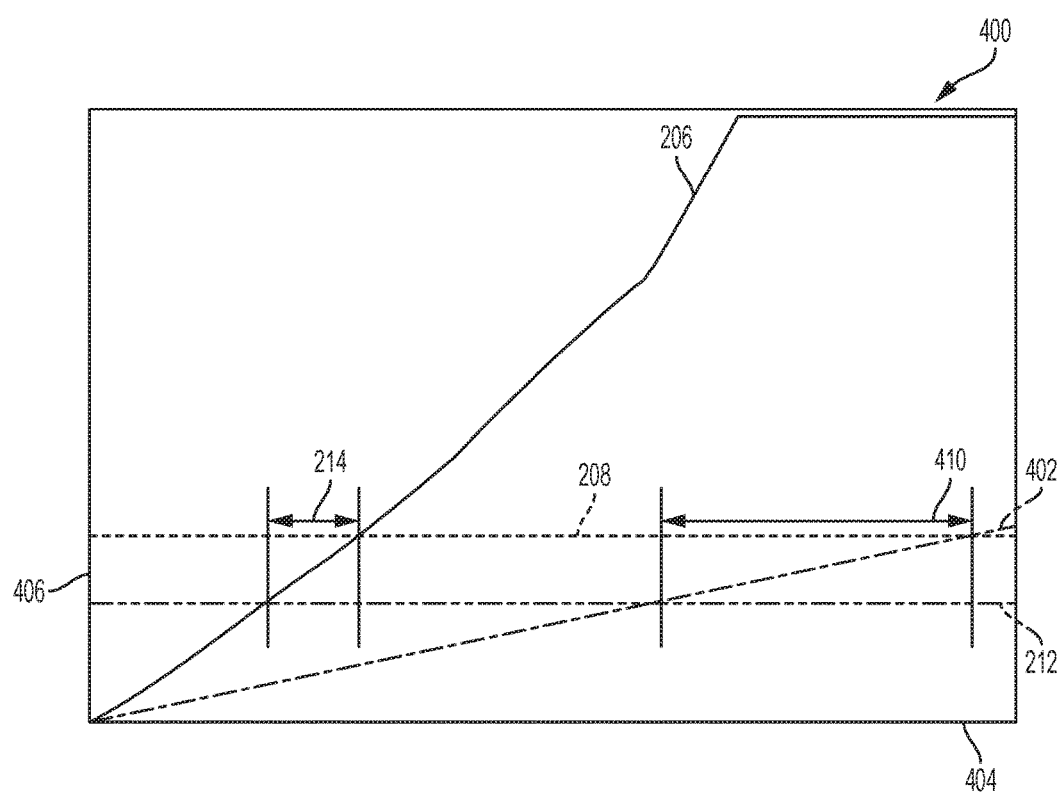
FIG. 4 is a graph 400 which illustrates an exemplary pedal map 402 in accordance with the present invention.

FIG. 4 is a graph 400 which illustrates an exemplary pedal map 402 in accordance with the present invention which solves this problem. FIG. 4 is similar to FIG. 2 and illustrates the pedal position along the horizontal axis 404 and the torque request output from the propulsion control system on the vertical axis 406. The graph 400 also includes the pedal map 206 from FIG. 2 for purposes of comparison. The same traction limit 208 and required torque 212 from FIG. 2 are presented on the graph 400 of FIG. 4. Further, the narrow pedal position range 214 for the pedal map 206 which provides a torque request that exceeds the required torque 212 but does not exceed the traction limit 208 is also illustrated on FIG. 4. The inventive exemplary pedal map 402 clearly provides a much wider range of pedal positions 410 within which a torque request will exceed the required torque 212 but not exceed the traction limit 208. This much wider pedal position range 410 makes is much easier for a driver to input a pedal position which falls within the range 410 so that the vehicle successfully climbs a grade.

Figure 5:
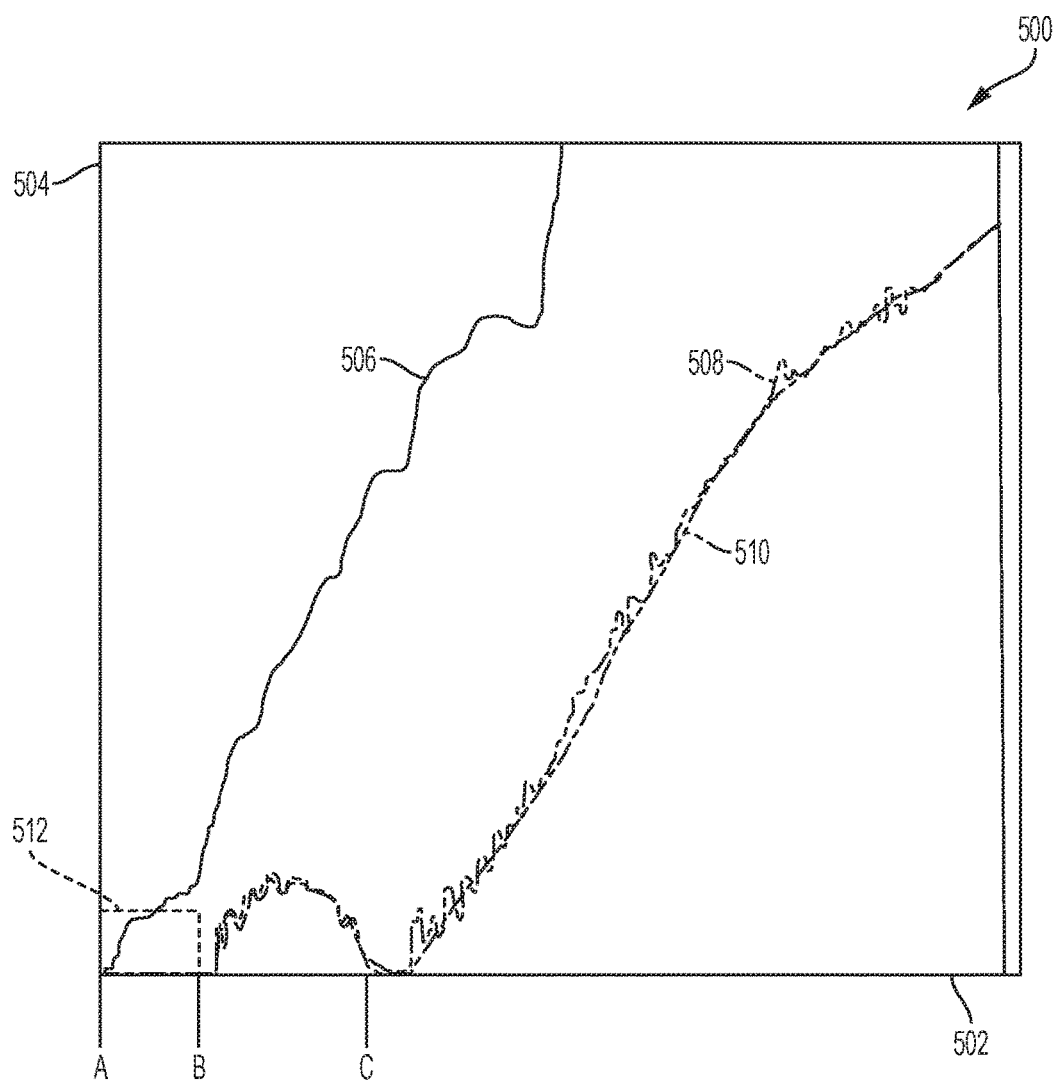
FIG. 5 illustrates a graph 500 illustrating an exemplary situation when driving a vehicle which includes a propulsion control system that uses the pedal map 402.

FIG. 5 illustrates a graph 500 that demonstrates how much easier it is for a driver to provide a pedal position which results in the vehicle successfully climbing the grade using the pedal map 402 illustrated by FIG. 4. Graph 500 is similar to that the graph 300 of FIG. 3 and indicates the passage of time on the horizontal axis 502 and the amplitude of the various signals on the vertical axis 504. The pedal position is indicated by line 506, the driven wheel speed is indicated by line 508, and the non-driven wheel speed is indicated by line 510. Further, the graph 500 indicates a brake application with line 512. At time "A", the wheel speeds 508 and 510 are both zero as the vehicle is stationary and because the vehicle is on a grade, the brake 512 has already been applied to prevent the vehicle from immediately moving down the grade. The driver then very quickly increases the pedal position 506 and starts to release the brake 512. At time "B", the brake 512 is completely released but the vehicle starts to descend the grade resulting in an increase in the absolute value of the wheel speeds 508 and 510. Meanwhile, the driver continues to quickly increase the pedal position 506. At time "C", the wheel speeds 508 and 510 both cross the zero line and start to increase together. The driver sensing that the vehicle is starting to successfully climb the grade continues to increase the pedal position 506 which results in the wheel speeds 508 and 510 continuing to climb. In this manner, the driver is able to provide a pedal position 506 which results in torque request such that the vehicle propulsion system outputs a torque that exceeds the torque required for the vehicle to climb the grade without providing a pedal position 506 that results in a torque request which would exceed the traction limit of the driven wheel and the driver is easily able to control the vehicle such that is climbs the grade.

The width of the range of pedal positions which result in a successful climb of a grade may be increased by reducing the slope of the pedal map for those pedal positions which are just below the traction limit. Although a traction limit may vary according to specific conditions, those values do not vary significantly even over a wide range of conditions. Therefore, a traction limit may be selected which reliably ensures that an actual traction limit is not exceeded in the vast majority of conditions. While the degree of grade does have an effect on the traction limit, that effect results in only a small variation. Thus, a traction limit can be reliably selected which is effective in the vast majority of real world conditions. In an inventive exemplary embodiment, a propulsion control system may then store a pedal map having a reduced slope over a range of pedal positions which are just below the selected traction limit. For example, referring to FIG. 4, the pedal map 402 has a slope which is lower than the conventional pedal map 206.

Figure 6:
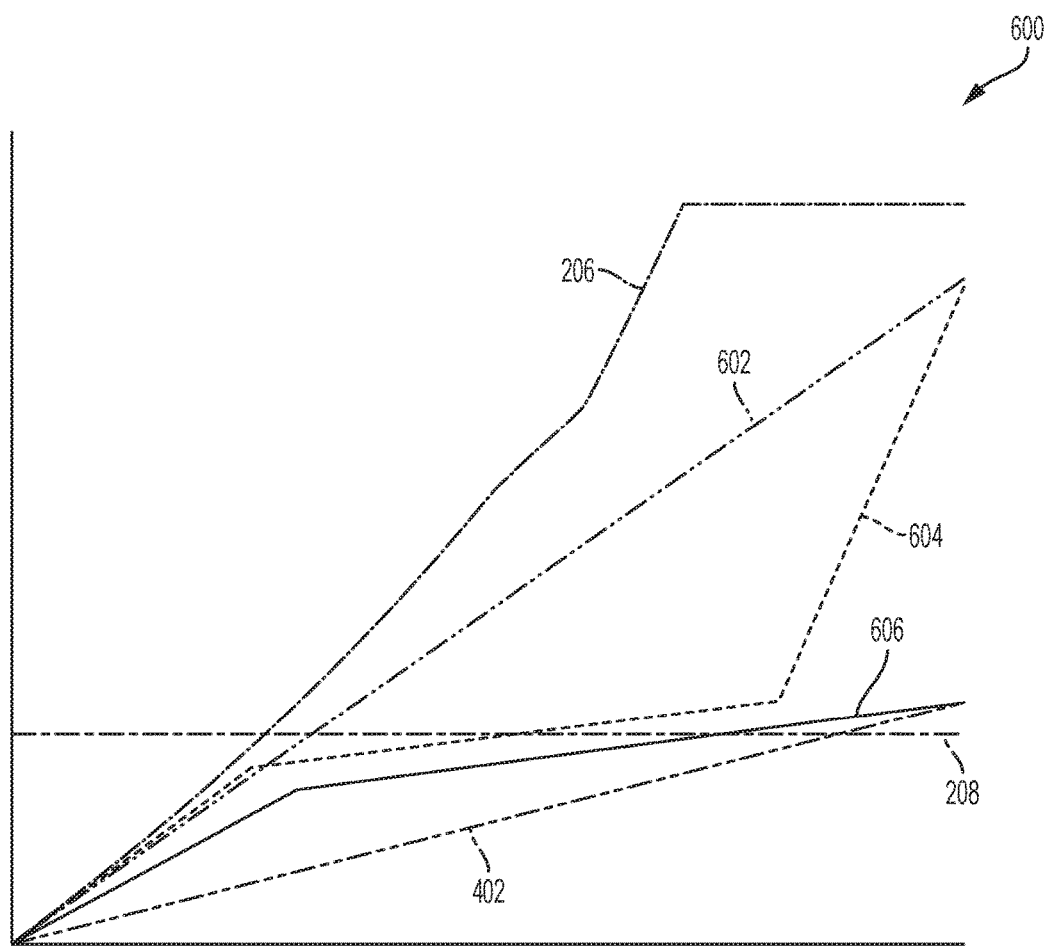
FIG. 6 is a graph 600 which illustrates a traction limit 208 and multiple exemplary pedal maps.

FIG. 6 is a graph 600 which illustrates a traction limit 208 and multiple exemplary pedal maps including the conventional pedal map 206. The pedal map 206 results in a maximum torque request at a range of pedal positions which extend below the maximum pedal position. In particular, the pedal map 206 results in a maximum torque request for any pedal position which exceeds about 70% of the maximum pedal position. This results in a slope to the pedal map 206 for those pedal positions, which submit a torque request that is lower than the traction limit 208, that is quite steep, thereby resulting in a very narrow range of pedal positions which will lead to a successful grade climb. An advantage to this steep slope is that a change in pedal position will quickly reach a torque request value which is required to propel the vehicle up the grade. Of course, this steep slope also means that only a slight further increase in pedal position will result in a pedal request that quickly exceeds the traction limit 208.

Exemplary pedal map 602 has a slope which is slightly lower than the pedal map 206, but still results in a slope, for those pedal positions which submit a torque request that is lower than the traction limit 208, that is quite steep, thereby also resulting in a very narrow range of pedal positions which will lead to a successful grade climb.

In contrast, the pedal map 604 significantly reduces the slope of the pedal map for those pedal positions which result in a torque request that is surrounds the traction limit 208. Further, the pedal map 604 includes a section which has a higher slope for those pedal positions which are just below the range surrounding the traction limit 208. This enables a quick increase in a torque request from zero to the lower limit of the range in which the slope is reduced as the pedal position increases. Further, the pedal map 604 includes another section of higher pedal positions which has again has a higher slope which enables a quick increase in torque. In comparison to the pedal map 402, the pedal map 604 provides the ability to output a much higher maximum torque request at high or maximum pedal positions.

FIG. 6 further illustrates yet another exemplary pedal map 606 which also significantly reduces the slope of the pedal map for those pedal positions which result in a torque request that surrounds the traction limit 208 and has a higher slope for those pedal positions which are just below the range surrounding the traction limit 208. However, like the pedal map 402, the pedal map 606 results in a maximum torque request which is significantly lower than that provided by pedal map 604.

In an exemplary embodiment, the inventive pedal map is substituted for a conventional pedal map in response to the propulsion system operating in a selected mode. For example, the inventive pedal map may be substituted in place of a conventional map in response to a selection of a tow/haul mode and/or a reverse gear selection. The inventive pedal map may be particularly advantageous in such a configuration where a vehicle may be towing a trailer that is heavily loaded and a reverse gear is selected to push the trailer up a relatively steep grade. In the absence of the inventive pedal map being used, such a situation may pose a particularly difficult challenge to the driver.

In an exemplary embodiment, the reduced slope portion of the pedal map only slightly exceeds the traction limit.

Further, in an exemplary embodiment, if the vehicle is equipped with a grade sensor, the inventive pedal map may also be substituted in the event that the grade sensor detects a grade that exceeds a predetermined threshold. Additional relevant conditions which may be useful to determine when to substitute the inventive pedal map is a low speed condition.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A propulsion control system for a vehicle, the system comprising:
    a driver pedal;
    a driver pedal position sensor that outputs a driver pedal position signal that indicates a position of the driver pedal;
    a memory that stores a first pedal map, wherein the first pedal map correlates a value of the driver pedal position signal to a torque request for a propulsion system in the vehicle; and
    a processor that generates a torque request based upon the driver pedal position signal and the first pedal map, wherein a first portion of the first pedal map near a predetermined traction limit has a first slope that defines a rate of change of the torque request to be less than a rate of change of the pedal position.

2. The system of claim 1, wherein a maximum torque request value defined by the first pedal map is substantially equal to the predetermined traction limit.

3. The system of claim 2, wherein a maximum torque request value defined by the first pedal map exceeds the predetermined traction limit.

4. The system of claim 1, wherein a maximum torque request value defined by the first pedal map at a maximum pedal position corresponds to less than a maximum possible torque output from the propulsion system.

5. The system of claim 1, wherein a second portion of the first pedal map has a second slope that is greater than the first slope.

6. The system of claim 5, wherein the second portion of the first pedal map is below the predetermined traction limit.

7. The system of claim 5, wherein the second portion of the first pedal map is above the predetermined traction limit.

8. The system of claim 1, wherein the memory further stores a second pedal map having a third slope that is greater than the first slope.

9. The system of claim 8, further comprising a mode indicator that indicates one of a first mode and a second mode and wherein the processor generates the torque request based upon the driver pedal position signal and the first pedal map in response to the mode indicator indicating the first mode and wherein the processor generates the torque request based upon the driver pedal position signal and the second pedal map in response to the mode indicator indicating the second mode.

10. The system of claim 9, wherein the first mode comprises one of a tow/haul mode and a reverse mode.

11. A propulsion system for a vehicle, the system comprising:
    a prime mover;
    a driven member receiving an output torque from the prime mover;
    a driver pedal;
    a driver pedal position sensor that outputs a driver pedal position signal that indicates a position of the driver pedal;
    a memory that stores a first pedal map, wherein the first pedal map correlates a value of the driver pedal position signal to a torque request for a propulsion system in the vehicle; and a processor that provides a torque request to the prime mover that is based upon the driver pedal position signal and the first pedal map, wherein a first portion of the first pedal map near a predetermined traction limit has a first slope that defines a rate of change of the torque request to be less than a rate of change of the pedal position.

12. The system of claim 11, wherein a maximum torque request value defined by the first pedal map is substantially equal to the predetermined traction limit.

13. The system of claim 12, wherein a maximum torque request value defined by the first pedal map exceeds the predetermined traction limit.

14. The system of claim 11, wherein a maximum torque request value defined by the first pedal map at a maximum pedal position corresponds to less than a maximum possible torque output from the propulsion system.

15. The system of claim 11, wherein a second portion of the first pedal map has a second slope that is greater than the first slope.

16. The system of claim 15, wherein the second portion of the first pedal map is below the predetermined traction limit.

17. The system of claim 15, wherein the second portion of the first pedal map is above the predetermined traction limit.

18. The system of claim 11, wherein the memory further stores a second pedal map having a third slope that is greater than the first slope.

19. The system of claim 18, further comprising a mode indicator that indicates one of a first mode and a second mode and wherein the processor generates the torque request based upon the driver pedal position signal and the first pedal map in response to the mode indicator indicating the first mode and wherein the processor generates the torque request based upon the driver pedal position signal and the second pedal map in response to the mode indicator indicating the second mode.

20. The system of claim 19, wherein the first mode comprises one of a tow/haul mode and a reverse mode.

* * * * *